Oct. 12, 1926.
C. I. HALL
1,603,050
DEMAND METER
Filed Nov. 28, 1923
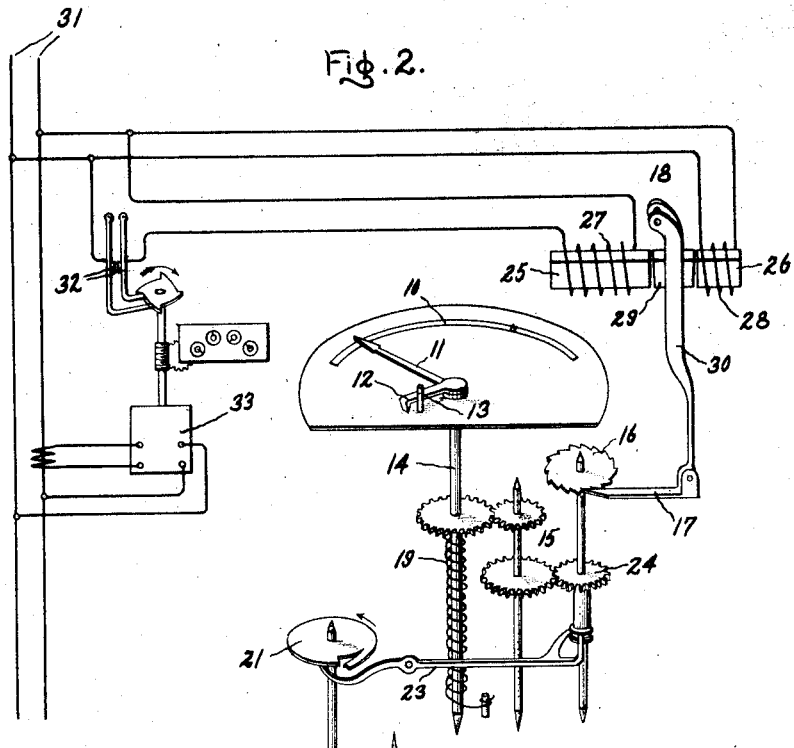
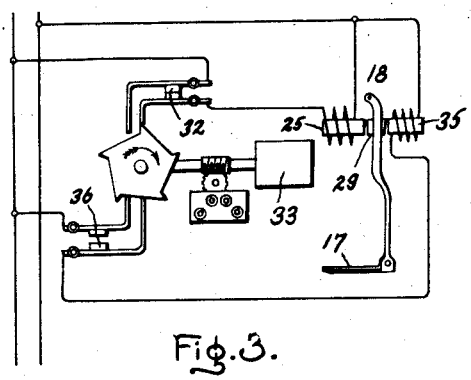
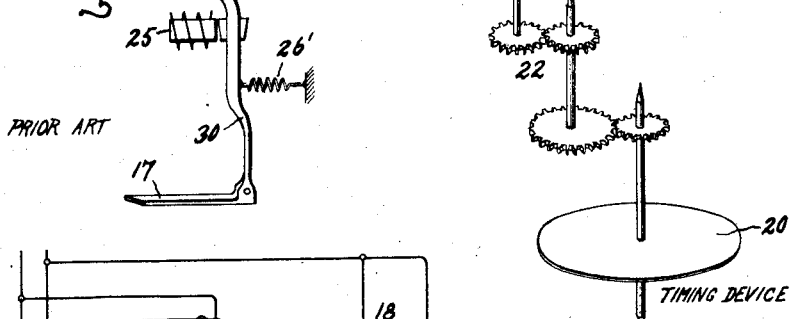
Inventor:
Chester I. Hall,
by Alexander S. Lunt
His Attorney.

Patented Oct. 12, 1926.

1,603,050

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND METER.

Application filed November 28, 1923. Serial No. 677,557.

My invention relates to improvements in electromagnetic motion reproducing devices of the ratchet type and in particular to an improved electromagnetic ratcheting relay for demand meters and other electromagnetic counting devices.

A well known type of demand meter consists of a friction pointer, a cooperating scale, a dog or pusher arranged to advance the pointer in accordance with the maximum demand of the metered quantity as determined from a plurality of definite time intervals, means for returning the dog to a zero position at the end of each time interval, a pawl and ratchet device for advancing the dog and an electromagnet for operating the pawl. In the well known arrangement, the electromagnet is energized intermittently by a contact device driven by a meter. When the electromagnet is energized, the pawl is advanced thereby and when the electromagnet is deenergized, a spring returns the pawl to its retracted position.

The source of supply for the electromagnet is generally taken from the most convenient supply system available, either alternating current or direct current, and if this supply system is subject to momentary failure or partial failures in voltage, there exists a source of error for the demand meter which, strange as it may seem, is more liable to produce an overregistration of the demand meter than an underregistration. This source of error may be visualized by assuming that if, when the meter operated contact is closed and the ratcheting pawl is in its advanced position, there occurs a momentary failure in the valtage of the source supplying the ratcheting solenoid, such failure will deenergize the solenoid and the spring will return the pawl to a retracted position. If, when the voltage returns, the meter operated contact is still closed, the pawl will again be advanced, producing an erroneous corresponding advance of the dog and possibly of the demand pointer.

It may appear that this possibility of error is so remote that it may be disregarded and in many cases this is true. However, conditions exist, for example on some of the large hydroelectric transmission systems in the western part of the United States where this source of error is a real problem. Instances are of record where there have been as high as fourteen failures in a minute due to lightning. If the existing type of demand meter is supplied from such a system, the maximum demand registration may be accurate, or it may be more or less high, depending upon whether the meter operated contact was open or closed during some or all of the periods of failure. It is easy to determine the number and duration of voltage failures, but it is not easy to determine whether or not such failures produce an error in the reading of a demand meter connected to such a system. Consequently, the type of demand meter mentioned as built in the past, is entirely unsuitable for such conditions and it is the primary object of my invention to overcome this difficulty.

In carrying my invention into effect, I replace the return spring of the ratcheting pawl by a second electromagnet which is energized from the same source as the pawl advancing electromagnet. By this simple expedient, the ratcheting pawl is moved in both directions by electromagnets and should the voltage fail when one or the other of said electromagnets is energized, nothing happens to the pawl since it is arranged to stay in either position to which it was last moved.

The additional electromagnet may be connected permanently to the source of supply, or it may be connected to the source of supply through a second meter operated contact which operates alternately with the existing contact. Both arrangements and certain additional advantages will be described hereinafter. The features of my invention which I believe to be novel and patentable will be pointed out in the claims appended hereto. For a better understanding of my invention, reference is made in the following description to the accompanying drawing in which Fig. 1 represents a ratcheting device of the prior art; Fig. 2, the preferred modification of my invention together with its relation to a demand meter, and Fig. 3, a further modification of my invention.

Referring first to Fig. 2, 10 represents a scale of the demand meter, 11 a friction pointer cooperating with the scale 10, 12 a dog or pusher for the friction pointer 11, and 13, a zero stop for the dog 12. The dog is arranged to be advanced through a shaft 14 and a train of gears 15 by means of a ratchet wheel 16, pawl 17 and the electromagnetic device shown at 18. The dog is arranged to be returned to the zero position against stop 13 by means of a spring 19 which is wound up as the dog is advanced and which is released by a timing device at predetermined intervals. A timing device represented at 20 drives a cam 21 through a gear train 22. This cam rocks a lever 23 and the lever is arranged when so rocked to slide gear 24, which is spleened on its shaft, out of mesh with the remainder of gear train 15, thereby allowing spring 19 to return the dog 12 to a zero position at the end of the time interval. Aside from the construction and operation of the electromagnetic device 18, the apparatus and the operation thereof is similar to previous instruments of its class.

The electromagnetic device 18 comprises in this instance, two stationary sections 25 and 26, having coils 27 and 28 respectively and both arranged to act upon a common armature 29, which moves the pawl 17 through the pivoted lever 30. In this instance, the section 25 is of greater strength than the section 26, so that when both coils 27 and 28 are energized, section 25 of the device predominates to pull the armature 29 and the pawl 17 to the left to the advanced position. Coil 28 is permanently connected to a source of supply 31 and coil 27 is connected to this source through the meter operated contact 32. 33 represents a watthour meter measuring the load the maximum demand of which is to be registered.

The operation under normal conditions is as follows: When contacts 32 are open, the armature 29 is drawn to the right by section 26 and when contacts 32 are closed, the armature 29 is drawn to the left by section 25, section 26 still remaining energized. This retracts and advances the pawl 17 in the usual way, section 26 taking the place of the spring 26' of the prior art shown in Fig. 1. Now, let us assume that the meter 33 stops with the contacts 32 closed and that while the contacts are in this condition, the voltage of the system supplying the electromagnetic device goes off and comes on several times. With the arrangement of Fig. 1, false registration will take place every time the voltage comes on, although the meter 33 is not running and an overregistration of the demand meter results. With the arrangement of Fig. 2, each failure and subsequent return of the voltage affects both sections of the electromagnetic devices alike. The armature 29 being in the advanced position, will stay there, due to friction, since when the voltage fails, there is no force pulling armature 29 to the right; consequently, an overregistration of the demand meter cannot take place due to momentary failures in the supply voltage. In the example just given, it was assumed that the meter 33 stopped with the contacts 32 closed. It will be evident, however, that the same description of the operation applies when the meter 33 is operating more or less slowly and a failure of voltage and subsequent return of the voltage takes place while the contacts 32 are closed. It will also be evident that the functions of the sections 25 and 26 may be reversed without affecting the final result, that is to say, section 26 may be made the stronger of the two sections and have its coil energized through the meter contact, while the other section may have its coil permanently connected to the same source.

There is another important advantage of my invention shown in Fig. 2, due to the compensating effect of the two sections 25 and 26 for varying voltages. In devices of this character, the force which advances the ratchet should be substantially uniform, since if it is too small, the pawl 17 may fail to advance the ratchet wheel the full distance of one tooth and if the force is too great, the operation may be so energetic as to produce an erroneous overshooting of the demand pointer 11. The construction of Fig. 1 will not tolerate a large variation in the operating voltage for the reasons just given. The device of Fig. 2, however, will tolerate a considerable variation in the operating voltage since the strength of both sections 25 and 26 increase and decrease proportionately with the voltage variations, leaving the resultant force, which must operate the ratchet substantially constant.

In Fig. 3, I have shown a modification of the actuating device embodying the broad principle of my invention. In this figure the two sections 25 and 35 may be of equal or nearly equal strength and their coils are both connected to the source of supply through meter operating contacts 32 and 36 respectively, which contacts are arranged to operate alternately as the meter 33 rotates. The armature 29 will be reciprocated back and forth under normal operation and the device will not be subject to false registrations due to momentary failures in the voltage since in this respect it is similar in operation to the device of Fig. 2. The modification of Fig. 3 is not self compensating for voltage variations since the two sections of the electromagnet do not act against each other simultaneously.

The device of Fig. 3 has an advantage over both the devices shown in Figs. 1 and 2 with respect to errors due to chattering contacts. Under certain conditions and critical speeds of the meter 33, the contacts 32 may have a tendency to chatter when the closure is made, so that they close the circuit, open the circuit, and close it again, where only one closure was intended. In the devices of Figs. 1 and 2, this would produce an extra registration, but with the arrangement of Fig. 3, the extra registration cannot take place, since the armature 29 will always remain in the position to which it was last moved until the opposite section of the electromagnetic device is energized due to a further rotation of the meter.

I have represented and described certain modifications of my invention as applied to a demand meter of a particular type, but it will be evident to those skilled in the art that various changes, both in the design of the actuating mechanism and the purpose for which it is used, may be made without departing from my invention and I intend to cover in the appended claims all modifications and uses falling fairly within the true spirit of my invention.

What I claim as new and desire to secure by Letters Patent of the United States, is:

1. An electromagnetic reciprocating device comprising a movable armature, a stationary core structure, an energizing coil on said structure for moving said armature in one direction, an energizing coil on said structure for moving said armature in the opposite direction, a common source of supply for said coils and an intermittently operated contact device mechanically independent of said electromagnet device included in the energizing circuit of at least one of said coils.

2. In a counting system of the electromagnetically operated type, a ratchet, a movable armature for operating said ratchet, electromagnetic means for moving said armature in a ratchet advancing direction, electromagnetic means for moving said armature in the opposite direction and a common source of supply for said two electromagnetic means, one of said electromagnet means being constantly energized from said source.

3. In a counting system of the electromagnetically operated ratchet type, a ratchet, a movable armature for operating said ratchet, an electromagnet for moving said armature in a ratchet advancing direction, an electromagnet for moving said armature in the opposite direction, said electromagnets having different strengths, a common source of supply for said two electromagnets and a contacting device in the energizing circuit of the stronger electromagnet.

4. In a counting system of the electromagnetically operated ratchet type, a ratchet, a movable armature for operating said ratchet, an electromagnet for moving said armature in a ratchet advancing direction, a weaker electromagnet for moving said armature in the opposite direction, a common voltage source for said electromagnets and a contacting device in the energizing circuit of the first mentioned electromagnet.

5. A demand meter comprising a pivoted friction pointer, a dog for advancing said pointer, a ratchet for intermittently advancing said dog, means for returning said dog to a zero position at predetermined time intervals, an intermittently energized electromagnet for advancing said ratchet and a normally constantly energized weaker electromagnet for retracting said ratchet.

6. In combination, an integrating meter, a demand register associated herewith, a ratchet for operating said demand register, an armature for reciprocating said ratchet, and a pair of electromagnets for alternately moving said armature to reciprocate said ratchet, a common source of supply for said electromagnets and a contact device operated by said integrating meter in the circuit of at least one of said electromagnets.

In witness whereof, I have hereunto set my hand this 24 day of Nov., 1923.

CHESTER I. HALL.